United States Patent
Mo (10) Patent No.: US 12,065,062 B2
(45) Date of Patent: Aug. 20, 2024

(54) CHILD SAFETY SEAT AND TELESCOPIC STRUCTURE THEREOF

(71) Applicant: WONDERLAND SWITZERLAND AG, Steinhausen (CH)

(72) Inventor: Xiaolong Mo, Steinhausen (CH)

(73) Assignee: Wonderland Switzerland AG, Steinhausen (CH)

( * ) Notice: Subject to any disclaimer, the term of this patent is extended or adjusted under 35 U.S.C. 154(b) by 111 days.

(21) Appl. No.: 17/812,534

(22) Filed: Jul. 14, 2022

(65) Prior Publication Data
US 2023/0014359 A1    Jan. 19, 2023

(30) Foreign Application Priority Data
Jul. 15, 2021    (CN) .......................... 202110801892.5

(51) Int. Cl.
*B60N 2/28*    (2006.01)
(52) U.S. Cl.
CPC .......... *B60N 2/2821* (2013.01); *B60N 2/2842* (2013.01); *B60N 2/2887* (2013.01)
(58) Field of Classification Search
CPC .. B60N 2/2821; B60N 2/2842; B60N 2/2848; B60N 2/2866; B60N 2/2887
See application file for complete search history.

(56) References Cited

U.S. PATENT DOCUMENTS 10,556,690 B2 *    2/2020    McGreevy ............... B60N 2/77
2004/0000802 A1    1/2004    Clement et al.

FOREIGN PATENT DOCUMENTS

| CN | 109955747 A | 7/2019 |
|---|---|---|
| CN | 110562103 A | 12/2019 |
| DE | 2008 051 693 | 4/2010 |
| DE | 2009 017 959 | 12/2010 |
| DE | 2013 105 599 | 3/2014 |

OTHER PUBLICATIONS

TW Office Action dated May 5, 2023 from the related TW Patent Application No. 111126716.
Office Action, DE Patent Application Serial No. 102022207223, Oct. 13, 2023.

* cited by examiner

*Primary Examiner* — Syed A Islam
(74) *Attorney, Agent, or Firm* — Fay Kaplun & Marcin, LLP (57) ABSTRACT

A child safety seat and a telescopic structure thereof. The telescopic structure of the child safety seat includes: a first part; a second part slidably cooperated with the first part; and a hydraulic damper disposed between the first part and the second part. The hydraulic damper is configured to cushion relative sliding between the first part and the second part.

20 Claims, 7 Drawing Sheets

CHILD SAFETY SEAT AND TELESCOPIC STRUCTURE THEREOF

CROSS REFERENCE TO RELATED APPLICATION

The present application claims priority to Chinese Patent Application No. 2021108018925, entitled "CHILD SAFETY SEAT AND TELESCOPIC STRUCTURE THEREOF" filed on Jul. 15, 2021, the content of which is incorporated herein by reference in its entirety.

TECHNICAL FIELD

The present disclosure relates to a child safety seat and a telescopic structure thereof.

BACKGROUND

Figure 1:
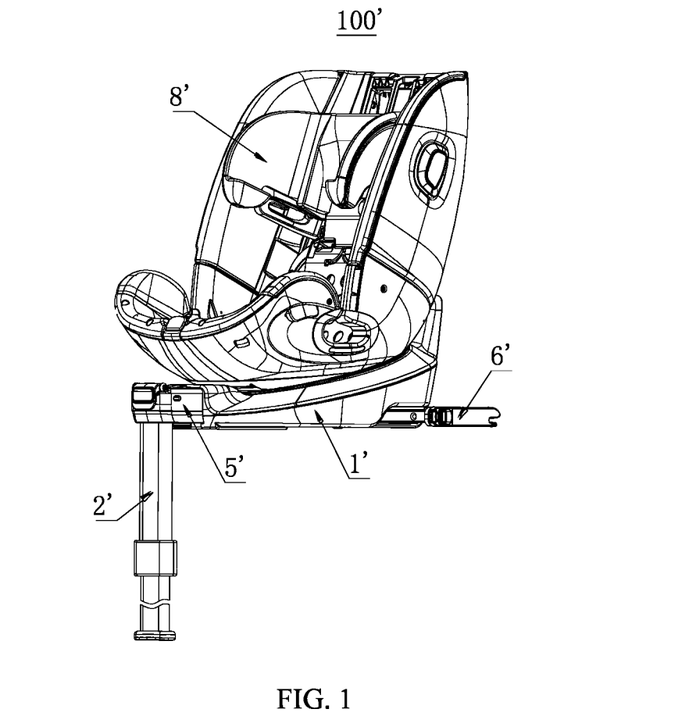
FIG. 1 schematically illustrates a conventional structure of a child safety seat.

Child safety seat provides safety protection for children traveling by car, and has become an indispensable means of transportation for children to travel. FIG. 1 shows a conventional structure of a child safety seat 100' comprising a base 1' for disposed on and supported by a vehicle seat and a seat 8' mounted on the base 1' for children to sit. A front end of the base 1' is provided with a support leg 2', a rear end of the base 1' is generally provided with an ISOFIX plug 6', the support leg 2' is adapted to be abutted against the floor in the vehicle, and the ISOFIX plug 6' is adapted to engage with the ISOFIX socket of the vehicle seat.

To facilitate storage, transportation and mounting of the child safety seat, the support leg 2' is generally pivotable with respect to the base 1', the length of the support leg 2' itself can be extended or retracted, and the position of the support leg 2' is adjustable in the front-rear direction relative to the base 1' through the connecting member 5' above the support leg 2'. The position of the ISOFIX plug 6' is also adjustable in the front-rear direction, so as to be received in the base 1' or to be extended out relative to the base 1'. In order to simplify the position adjustment operation of these parts, when the support leg 2' is pivoted to the vertical direction, the support leg 2' is designed to be elongated under its own gravity. In addition, the forward or rearward position adjustment of the support leg 2' or ISOFIX plug 6' can be achieved by an additionally provided drive spring for their automatic extension (manual retraction) or automatic retraction (manual extension).

SUMMARY

In an aspect, the present disclosure provides a telescopic structure of a child safety seat including: a first part; a second part slidably cooperated with the first part; and a hydraulic damper disposed between the first part and the second part. The hydraulic damper is configured to cushion relative sliding between the first part and the second part.

In another aspect, the present disclosure further provides a telescopic structure of a child safety seat including: a first part, a second part slidably cooperated with the first part, an elastic member for driving the second part to slide relative to the first part, and a damper for cushioning a driving force of the elastic member.

In another aspect, the present disclosure further provides a child safety seat equipped with any of the telescopic structure disclosed herein.

DETAILED DESCRIPTION

Referring to FIGS. 2 to 7, a telescopic structure 200 of a child safety seat (also referred to herein as a telescopic structure for short) is shown according to an embodiment of the present disclosure. A child safety seat includes a base 1 and a seat (not shown in figures) mounted on the base 1. A front end of the base 1 is provided with a support leg 2, and a rear end of the base 1 is provided with a connecting plug 6. Generally, the support leg 2 is pivotable relative to the base 1 to be received at a bottom of the base 1 or opened downward from the base 1 to be abutted against a floor inside a vehicle. The connecting plug 6 is, for example, a ISOFIX plug to be engaged with a ISOFIX socket of the vehicle seat.

Figure 2:
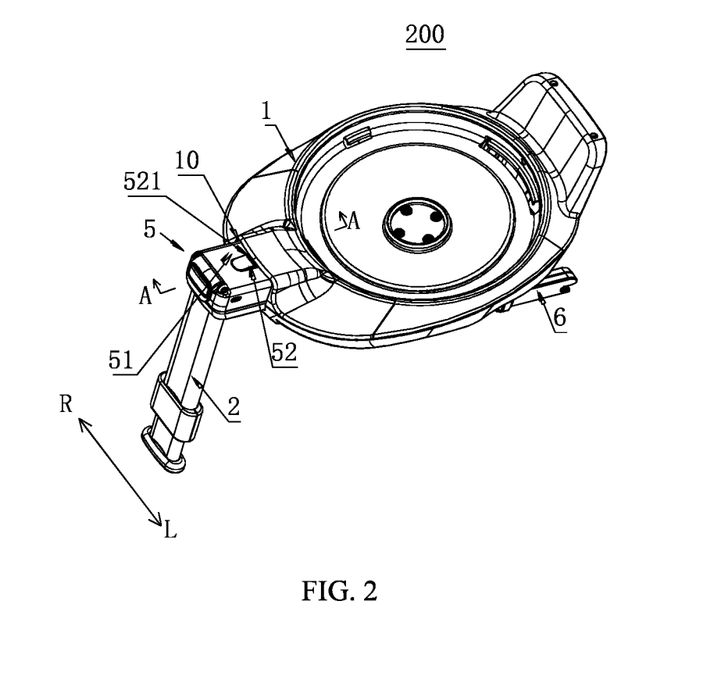
FIG. 2 is a schematic perspective view of a telescopic structure of a child safety seat according to an embodiment of the present disclosure.
Figure 3:
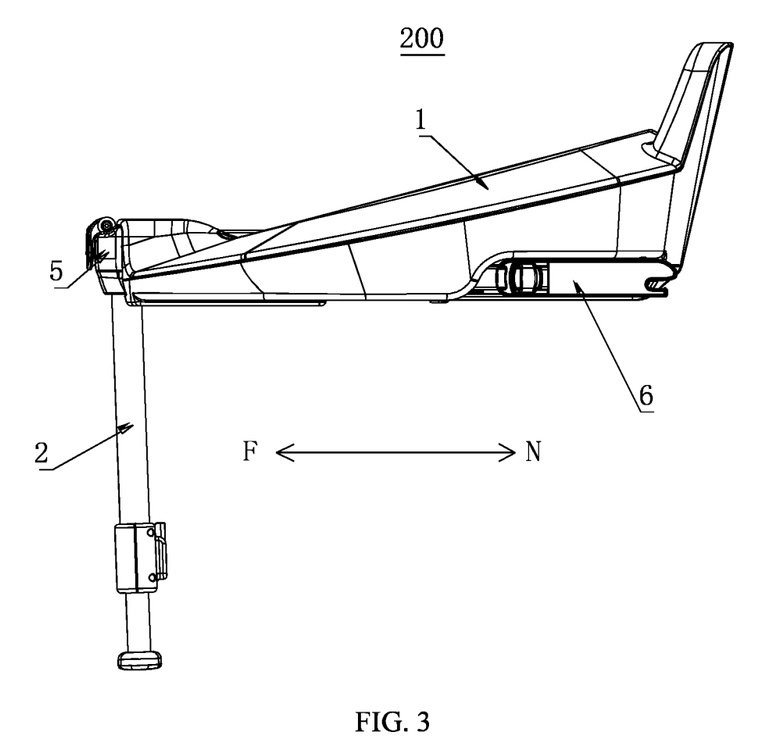
FIG. 3 is a schematic side view of the telescopic structure shown in FIG. 2.

It should be noted that, in the absence of special description, the orientation terms, such as "front", "rear", "left", "right", "up", "down" in various examples of the disclosure are based on orientations shown in FIG. 2 and FIG. 3 (in FIG. 2 and FIG. 3, the left and right directions are indicated by arrow L and arrow R, respectively, and the front and rear directions are indicated by arrow F and arrow N, respectively). These orientation terms are only intended to describe various embodiments of the disclosure more clearly, and are not intended to improperly limit the protection scope of the disclosure.

Referring to FIG. 2, a connecting member 5 is disposed on the upper end of the support leg 2. In the present embodiment, the upper end of the support leg 2 is pivotally connected to the connecting member 5, for example, by a pin 25 (referring to FIG. 5). In some other examples, the connecting member 5 and the upper end of the support leg 2 may also in a relatively fixed relationship. The connecting member 5 and the base 1 are cooperated with each other in the horizontal direction in a forward and backward sliding manner, so that the support leg 2 are retractable relative to the base 1 in the front-rear direction, so as to meet the use demand of the consumer. In the present embodiment, the base 1 slidably cooperated is referred to as a first part, and the connecting member 5 is referred to as a second part.

Figure 5:
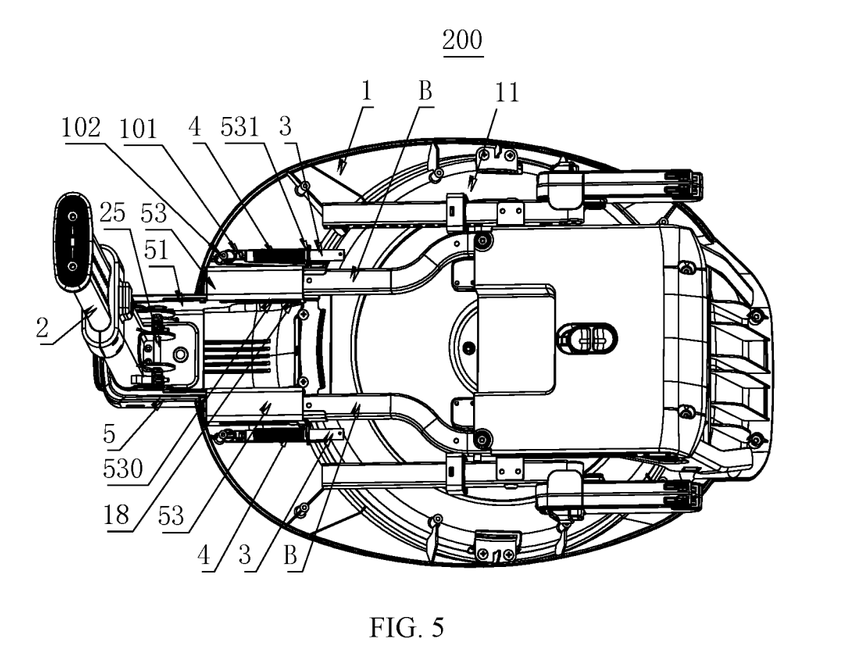
FIG. 5 is a schematic bottom perspective view of the telescopic structure shown in FIG. 2, illustrating the support leg extended forward with respect to the base.
Figure 6:
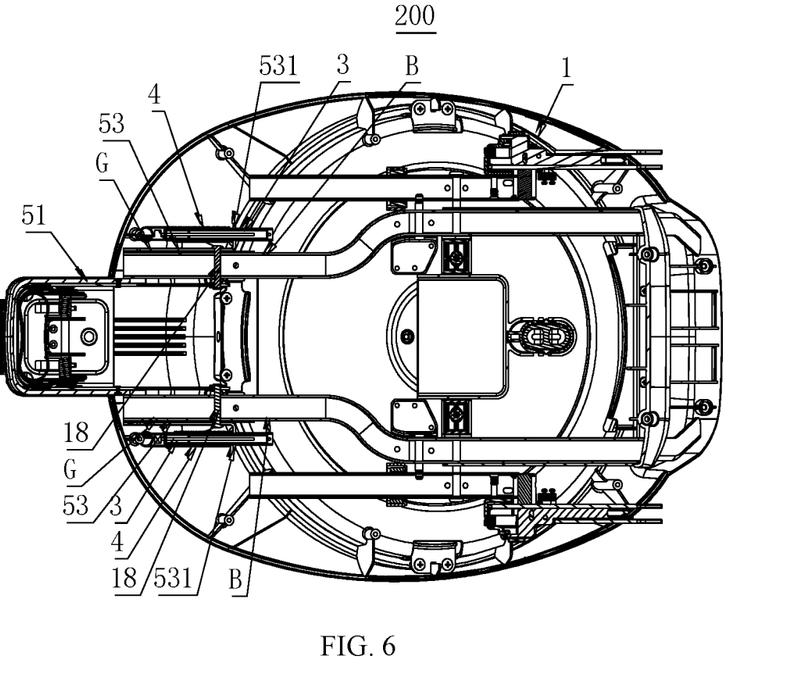
FIG. 6 is a schematic bottom view of the telescopic structure shown in FIG. 2 with a partial cross-sectional structure, illustrating the support leg extended forward with respect to the base.
Figure 7:
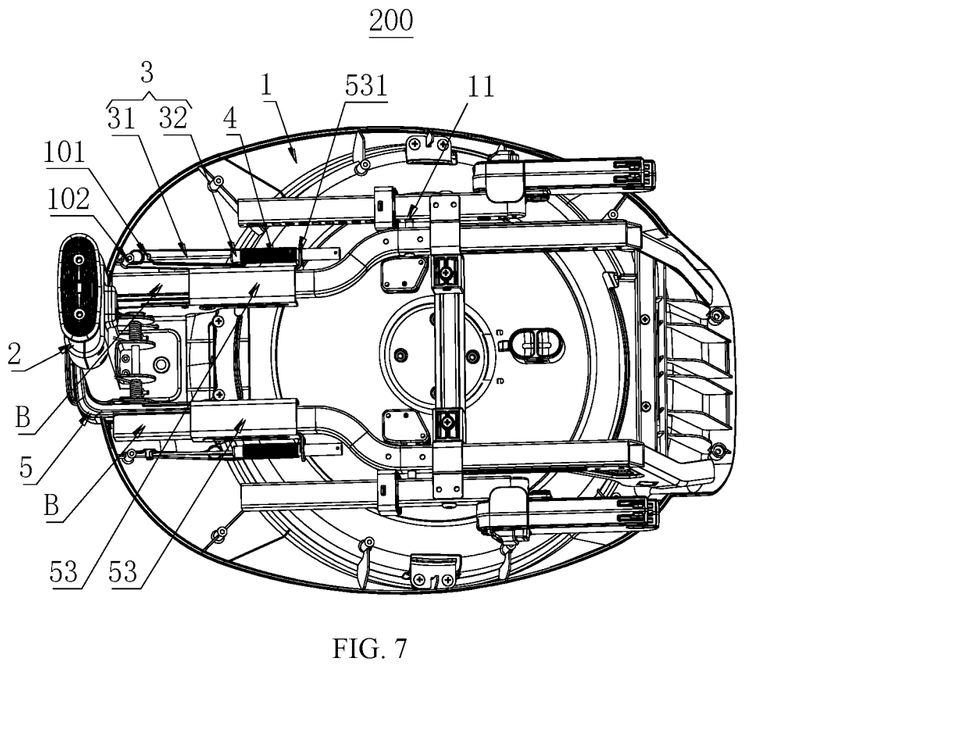
FIG. 7 is a schematic bottom perspective view of the telescopic structure shown in FIG. 2, illustrating the support leg retracted rearward with respect to the base.

Referring to FIGS. 5 to 7, in the present embodiment, the telescopic structure 200 further includes an elastic member 4 mounted between the base (first part) 1 and the connecting member (second part) 5 for driving the connecting member 5 to slide relative to the base 1, so that the connecting member 5 is capable of being automatically extended forward or retracted rearward relative to the base 1. The elastic member 4 is, for example, a drive spring. For example, in some embodiments, after the connecting member 5 is manually moved rearward and thus retracted back to a preset retracted position relative to the base 1, connecting member 5 can be locked in the retracted position by any suitable locking mechanism (such as a resilient locking pin), in this case, the elastic member 4 is elastically deformed, and thus generates a resilient restoring force that drives the connecting member 5 to be extended forward. When the locking of the connecting member 5 by the locking mechanism is released, the connecting member 5 is automatically extended forward under the resilient restoring force of the elastic member 4. On the contrary, in other embodiment, when the connecting member 5 is manually moved forward and thus extended to a preset extended position relative to the base 1, the connecting member 5 can be locked in the extended position by any suitable locking mechanism (such as a resilient locking pin), in this case, the elastic member 4 is elastically deformed, and thus generates a resilient restoring force that drives the connecting member 5 to retract rearward. When the locking of the connecting member 5 by the locking mechanism is released, the connecting member 5 is automatically retracted rearward under the resilient restoring force of the elastic member 4.

As shown in FIGS. 5 to 7, in the present embodiment, the telescopic structure 200 further includes a hydraulic damper 3 disposed between the base 1 and the connecting member 5, and the hydraulic damper 3 is, for example, a hydraulic damper. For example, the hydraulic damper 3 include a cylinder 32 and a piston bar 31 extended from the cylinder 32. The piston bar 31 may serve as a first end of the hydraulic damper 3 and the cylinder 32 may serve as a second end of the hydraulic damper 3. Alternatively, the cylinder 32 may serve as the first end of the hydraulic damper 3, and the piston bar 31 may serve as the second end of the hydraulic damper 3. The hydraulic damper 3 is adapted to cushion the relative sliding between the base 1 and the connecting member 5, so that the sliding for the automatically extending or automatically retracting connecting member 5 becomes gentle, thereby avoiding the noise caused by the sudden movement of the connecting member 5 under the action of the elastic member 4 and the discomfort of the child seated in the child safety seat. Therefore, the riding experience of the child is improved, and the use experience and product satisfaction of the consumer are improved.

A preferred implementation of the base 1, the hydraulic damper 3, the elastic member 4 and the connecting member 5 is shown in this embodiment. Referring to FIGS. 5 to 7, the base 1 can include a base bracket 11, which is, for example, a frame structure made of metal, and the base bracket 11 includes two parallel slide bars B. The rear end of the connecting member 5 includes two sliding sleeves 53. Inner holes of two sliding sleeves 53 form two slide ways G slidably cooperated with the two slide bars B. Each sliding sleeve 53 is provided with a lug 531. The hydraulic damper 3 and the elastic member 4 are both located outside the slide way G. The first end of the hydraulic damper 3 (for example, its piston bar 31) is connected to the first connection point 101 of the base 1, and the second end of the hydraulic damper 3 (for example, its cylinder 32) is connected to the lug 531 of the connecting member 5. The first end of the elastic member 4 is connected to the second connection point 102 of the base 1, and the second end of the elastic member 4 is connected to the lug 531 of the connecting member 5 or the cylinder 32. In some examples, the first connection point 101 and the second connection point 102 are formed on the same part or on different parts of the base 1. It can be understood that the extension direction of the hydraulic damper 3 is substantially parallel to the extension direction of the slide way G, and the elastic member 4 is arranged substantially parallel to the hydraulic damper 3.

As shown in FIG. 5, in the present embodiment, the elastic member 4 is sleeved on the outside of the hydraulic damper 3. It should be noted that, in some other embodiments, the elastic member 4 may also be disposed in other ways, for example, the elastic member 4 may be disposed in the slide way G as long as the elastic member 4 is capable of driving the connecting member 5 to move.

Referring to FIG. 5 and FIG. 6, in some examples, the wall body of the sliding sleeve 53 is provided with an elongated hole 530, and a bolt 18 inserted into the elongated hole 530 is mounted on the slide bar B. The cooperation of the bolt 18 with both ends of the elongated hole 530 restricts the extending length and retracting length of the connecting member 5.

Referring to FIG. 7, in the present embodiment, when the connecting member 5 is retracted rearward relative to the base 1 and locked, the elastic member 4 is stretched, so that when the locking of the connecting member 5 is released, the elastic member 4 drives the connecting member 5 and the support leg 2 to automatically extend forward relative to the base 1 while returning to the state shown in FIG. 5. Of course, in other embodiments, the elastic member 4 is designed to be stretched when the connecting member 5 is extended forward relative to the base 1 and is locked, so that when the locking of the connecting member 5 is released, the elastic member 4 drives the connecting member 5 and the support leg 2 to be automatically retracted rearward relative to the base 1 under the effect of the resilient restoring force of the elastic member 4.

Figure 4:
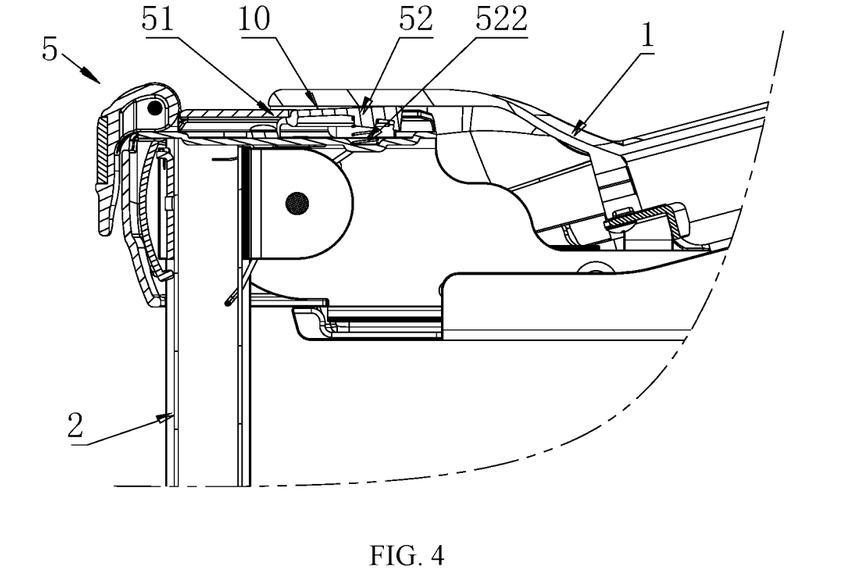
FIG. 4 is a schematic partial cross-sectional view taken along line A-A of the telescopic structure shown in FIG. 2.

Referring to FIGS. 2 and 4, in some embodiments, the front end of the base 1 is provided with an accommodating recess part 10, and the connecting member 5 is provided with a slider part 51 slidably cooperated with the accommodating recess part 10. The slider part 51 is provided with an extension positioning member 52 elastically supported by, for example, a spring 522. When the connecting member 5 is extended forward into place, the extension positioning member 52 is located outside the accommodating recess part 10 and upwardly tilted to be abutted against a front edge of the base 1, so that the retraction of the connecting member 5 relative to the base 1 is restricted. When it is necessary to retract the connecting member 5 rearward, the extension positioning member 52 is pressed downwardly to allow the extension positioning member 52 to move with the slider part 51 into the accommodating recess part 10. When the extension positioning member 52 is located inside the accommodating recess part 10, the surface 521 of the extension positioning member 52 is in contact with the wall body of the accommodating recess part 10. The surface 521 is provided with a structure for increasing friction. When the connecting member 5 slides relative to the base 1, the contact between the surface 521 and the wall body of the accommodating recess part 10 has a cushioning effect, that is, the extension positioning member 52 serves as a damper for cushioning the driving force (i.e., the resilient restoring force of the elastic member 4 mentioned above) of the elastic member 4 for driving the connecting member 5 to slide, so that the movement of the connecting member 5 is more gentle. In some embodiments, the structure on the surface 521 for increasing friction is, for example, a protruding strip structure, a protruding point structure, a rubber layer, or other suitable structure. In some other embodiments, the extension positioning member 52 is, for example, movably (e.g. pivotably) disposed on the slider part 51, so that when it is necessary to restrict the rearward retraction of the connecting member 5 relative to the base 1, the user may operate the extension positioning member 52, such that the extension positioning member 52 is protruded from the slider part 51 to be abutted against the front edge of the base 1; and when it is necessary to retract the connecting member 5 rearward, the user may operate the extension positioning member 52, so that the extension positioning member 52 is no longer protruded from the slider part 51.

Referring to FIG. 6, it will be appreciated that although the base 1 is formed with two slide bars B and the connecting member 5 is formed with two slide ways G in the present embodiment, the base 1 may be formed with one or more slide bars B, and accordingly, the connecting member 5 may be formed with one or more slide ways G cooperating with the slide bars B in other embodiments. Furthermore, in other embodiments, it is also possible to form at least a slide way G on the base 1, and accordingly, to form at least a slide bar B on the connecting member 5, which also fall within the scope of the present disclosure.

It should be noted that, although the hydraulic damper 3 and the extension positioning member 52 are provided to cushion the sudden movement of the connecting member 5 driven by the elastic member 4 in the present embodiment, other types of dampers, for example, dampers with elastic structures, may be provided between the connecting member 5 and the base 1 to cushion the sudden movement of the connecting member 5 in other embodiments. Furthermore, in some embodiments, the hydraulic damper 3 may not be provided, for example, and the extension positioning member 52 may be used alone as a damper to cushion the sliding of the connecting member 5.

Figure 8:
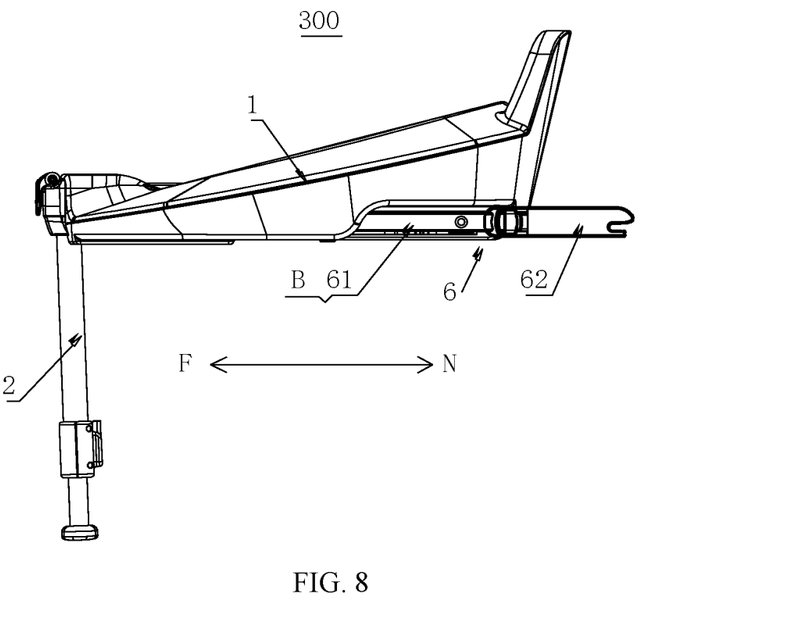
FIG. 8 is a schematic side view of a telescopic structure of a child safety seat according to another embodiment of the disclosure, illustrating a connecting plug extended with respect to a base.
Figure 9:
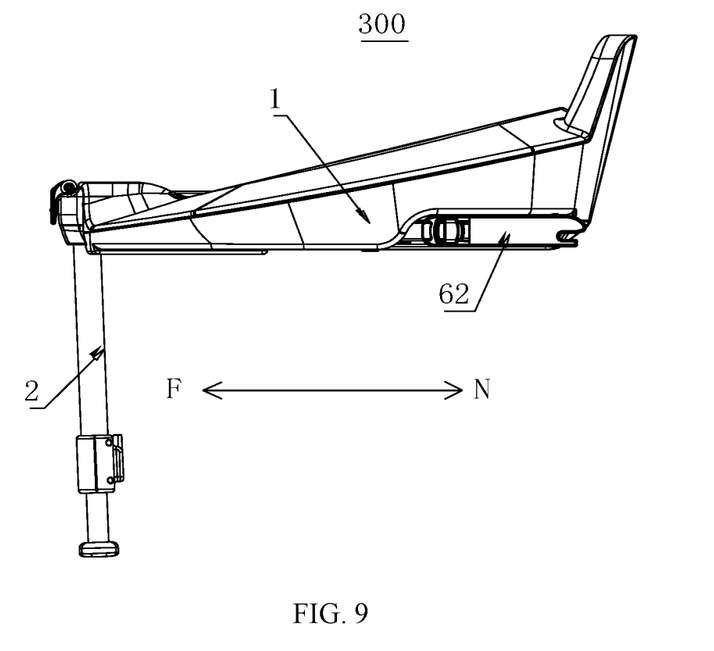
FIG. 9 is a schematic side view of the telescopic structure shown in FIG. 8, illustrating the connecting plug retracted with respect to the base.
Figure 10:
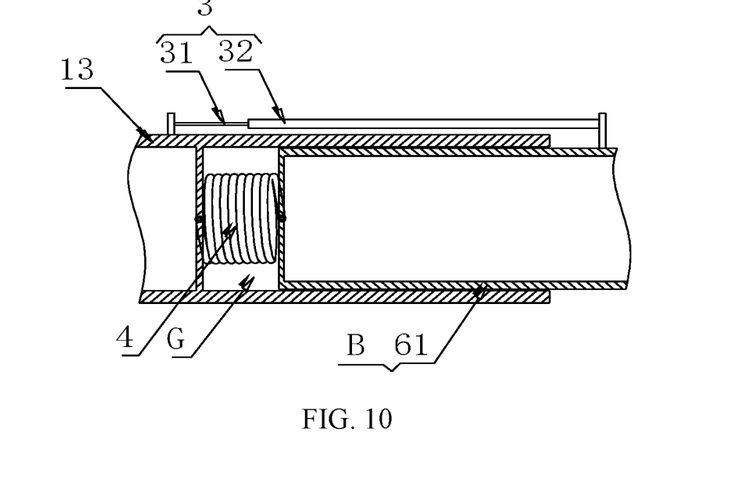
FIG. 10 schematically illustrates a partial cross-sectional view structure of the connecting plug of FIG. 9.

Referring to FIGS. 8 to 10, a telescopic structure 300 of a child safety seat according to another embodiment of the present disclosure is shown. The structure of the child safety seat includes a base 1 and a seat (not shown) mounted on the base 1. The front end of the base 1 is provided with a support leg 2, and the rear end of the base 1 is provided with a connecting plug 6. The support leg 2 may be directly connected to the front end of the base 1. Alternatively, as shown in the above embodiments, the support leg 2 may be slidably connected to the base 1 through the connecting member 5, and the elastic member 4 and the hydraulic damper 3 may be provided between the connecting member 5 and the base 1. The connecting plug 6 is adapted to be connected to the socket of the vehicle seat, and the connecting plug 6 is, for example, an ISOFIX plug.

In the present embodiment, the base 1 can serve as a first part, the connecting plug 6 can serve as a second part, and the connecting plug 6 is slidably cooperated with the base 1. More specifically, the base 1 includes a first pipe 13, and an inner hole of the first pipe 13 forms a slide way G. The connecting plug 6 includes a second pipe 61 and a plug portion 62 disposed at the rear end of the second pipe 61. The slide bar B is formed on the second pipe 61. The slidably cooperation between the slide bar B and the slide way G allows the slidably cooperation between the connecting plug 6 and the base 1. The connecting plug 6 is automatically extended rearward with respect to the base 1 (the connecting plug 6 is manually retracted forward) or automatically retracted forward with respect to the base 1 (the connecting plug 6 is manually extended rearward) under the action of the elastic member 4, and the sudden sliding of the connecting plug 6 with respect to the base 1 under the action of the elastic member 4 is cushioned by the hydraulic damper 3. The structure of the hydraulic damper 3 is substantially the same as that of the above-described embodiment.

As can be seen from FIG. 10, the elastic member 4 in the present embodiment is sleeved in the slide way G, and the first end of the elastic member 4 is connected to the first pipe 13, and the second end of the elastic member 4 is connected to the second pipe 61. The hydraulic damper 3 is located outside the slide way G, and the first end (e.g., piston bar 31) of the hydraulic damper 3 is connected to the first pipe 13 of the base 1, and the second end (e.g., cylinder 32) of the hydraulic damper 3 is connected to the second pipe 61. Of course, the arrangement mode of the elastic member 4 and the hydraulic damper 3 is not limited to the above embodiments, and other suitable arrangement modes may be adopted as long as the purpose of the disclosure can be realized. For example, in another embodiment, the elastic member 4 is located outside the slide way G and is sleeved outside the hydraulic damper 3.

Figure 11:
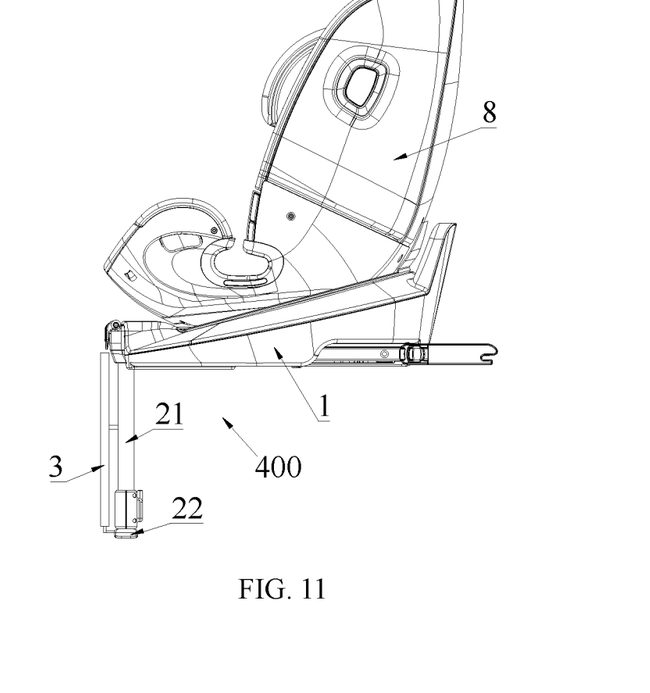
FIG. 11 is a schematic side view of a telescopic structure of a child safety seat according to another embodiment of the disclosure, illustrating a retracted support leg.
Figure 12:
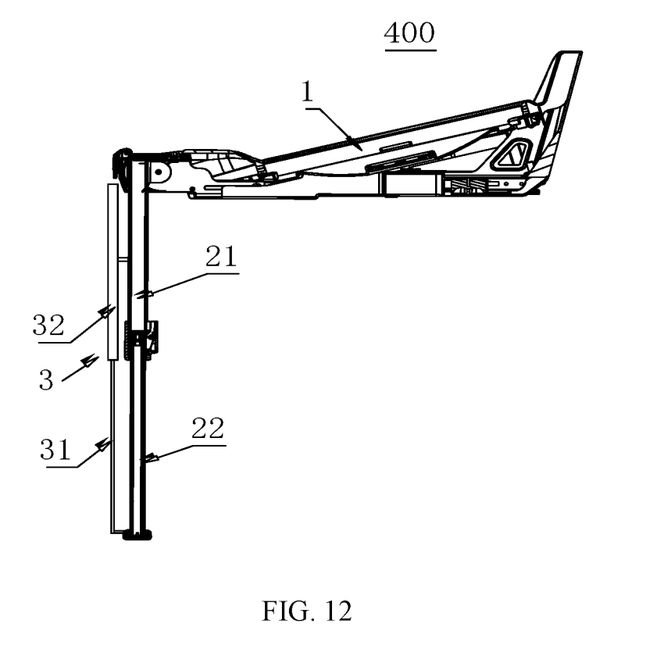
FIG. 12 is a schematic side view of the telescopic structure shown in FIG. 11, illustrating the extended support leg.

Referring to FIG. 11 and FIG. 12, there is shown a telescopic structure 400 of a child safety seat according to another embodiment of the present disclosure. The child safety seat includes a base 1 and a seat 8 mounted on the base 1. The front end of the base 1 is provided with a support leg 2, and the rear end of the base 1 is provided with a connecting plug 6. With reference to the above embodiments, the support leg 2 is slidably connected to the base 1 through the connecting member 5, and the above-mentioned elastic member and the hydraulic damper is disposed between the connecting member 5 and the base 1, and/or the connecting plug 6 is an ISOFIX plug, and the above-mentioned elastic member and the hydraulic damper is also be disposed between the connecting plug 6 and the base 1.

Referring to FIG. 11 and FIG. 12, the support leg 2 in the present embodiment includes a pivoting leg part 21 pivotally connected, for example, to the front end of the base 1, and a telescoping leg part 22 slidably cooperated with the pivoting leg part 21, which is capable of, for example, being retracted into or extended from the pivoting leg part 21 to be abutted against the floor inside vehicle. The pivoting leg part 21 may serve as a first part, and the telescoping leg part 22 may serve as a second part. A hydraulic damper 3 is disposed between the pivoting leg part 21 and the telescoping leg part 22. For example, a first end of the hydraulic damper 3 (e.g., a piston bar 31) is connected to the telescoping leg part 22, and a second end (e.g., the cylinder 32) is connected to the pivoting leg part 21. In the case where the support leg 2 is placed vertically, when the telescopic leg part 22 slides downward with respect to the pivoting leg part 21 under the action of gravity, the hydraulic damper 3 can effectively cushion the sudden sliding of the telescopic leg part 22.

The present disclosure further provides a child safety seat, which is equipped with the telescopic structure of the child safety seat described in any of the above embodiments.

The technical features of the above-described embodiments can be combined in any manner. For the sake of brevity, not all possible combinations of the technical features of the above-described embodiments are described. However, as long as there is no contradiction in the combination of these technical features, they should be considered to be within the scope of this specification.

The above-described embodiments only express several implementations of the disclosure, though their description is rather specific and detailed, they cannot be construed as limiting the scope of the disclosure. It should be noted that, for a person skilled in the art, several modifications and improvements can be made without departing from the concept of the disclosure, which are within the protection scope of the present disclosure. Therefore, the protection scope of the disclosure shall be subject to the appended claims.

What is claimed is:

1. A telescopic structure of a child safety seat, comprising:
    a first part;
    a second part slidably cooperated with the first part; and
    a hydraulic damper disposed between the first part and the second part,
    wherein the hydraulic damper is configured to cushion relative sliding between the first part and the second part, and
    wherein the child safety seat is configured to be removably mounted on a seat of a vehicle.

2. The telescopic structure of claim 1, wherein one of the first part and the second part is formed with at least one slide way, and other one of the first part and the second part is formed with at least one slide bar slidably cooperated with the at least one slide way; and wherein the telescopic structure further comprising:
    an elastic member configured to drive the second part to slide relative to the first part so that the second part can be automatically extended or retracted relative to the first part.

3. The telescopic structure of claim 2, wherein the child safety seat comprises a base and a support leg, the base serves as the first part, an upper end of the support leg is provided with a connecting member, and the connecting member serves as the second part.

4. The telescopic structure of claim 3, wherein the hydraulic damper is located outside the slide way, a first end of the hydraulic damper is connected to a first connection point of the base, and a second end of the hydraulic damper is connected to the connecting member; and an extension direction of the hydraulic damper is parallel to an extension direction of the slide way.

5. The telescopic structure of claim 4, wherein the elastic member is sleeved outside the hydraulic damper, and a first end of the elastic member is connected to a second connection point of the base, and a second end of the elastic member is connected to the connecting member.

6. The telescopic structure of claim 3, wherein a front end of the base is provided with an accommodating recess part, the connecting member has a slider part slidably cooperated with the accommodating recess part, and the slider part is provided with an extension positioning member, the extending positioning member is configured to restrict a retraction of the connecting member relative to the base when the extending positioning member is outside the accommodating recess part.

7. The telescopic structure of claim 3, wherein the support leg is pivotally connected to the connecting member.

8. The telescopic structure of claim 6, wherein the extending positioning member is capable of moving along with the slider part to an inside of the accommodating recess part; and the extension positioning member has a surface adapted to contact a wall body of the accommodating recess part, and the surface is provided with a structure for increasing friction force.

9. The telescopic structure of claim 8, wherein the surface is provided with a protruding strip structure, a protruding point structure or a rubber layer.

10. The telescopic structure of claim 3, wherein the base comprises a base bracket comprising two parallel slide bars; and a rear end of the connecting member comprises two sliding sleeves, inner holes of the two sliding sleeves form two slide ways slidably cooperated with the two parallel slide bars, and at least one of the sliding sleeves is provided with a lug configured to be connected to the elastic member.

11. The telescopic structure of claim 10, wherein the lug is further configured to be connected to the hydraulic damper.

12. The telescopic structure of claim 10, wherein a wall body of the sliding sleeve is provided with an elongated hole, and the slide bar is mounted with a bolt inserted into the elongated hole.

13. The telescopic structure of claim 2, wherein the child safety seat comprises a base and a connecting plug, and the connecting plug is configured to be connected to a socket of the seat of the vehicle, wherein the base serves as the first part, and the connecting plug serves as the second part.

14. The telescopic structure of claim 12, wherein the base comprises a first pipe, and an inner hole of the first pipe forms the slide way; wherein the connecting plug comprises a second pipe and a plug portion disposed at a rear end of the second pipe, and the slide bar is formed at the second pipe; and wherein the elastic member is disposed in the slide way, a first end of the elastic member is connected to the first pipe, and a second end of the elastic member is connected to the second pipe.

15. The telescopic structure of claim 13, wherein the hydraulic damper is located outside the slide way, a first end of the hydraulic damper is connected to the base, and a second end of the hydraulic damper is connected to the second pipe; and an extension direction of the hydraulic damper is parallel to an extension direction of the slide way.

16. The telescopic structure of claim 1, wherein the child safety seat comprises a support leg comprising a pivoting leg part and a telescoping leg part slidably cooperating with the pivoting leg part, the pivoting leg part serves as the first part and the telescoping leg part serves as the second part.

17. A telescopic structure of a child safety seat, comprising:
    a first part;
    a second part slidably cooperated with the first part;
    an elastic member configured to drive the second part to slide relative to the first part; and
    a damper configured to cushion a driving force of the elastic member,
    wherein the child safety seat is configured to be removably mounted on a seat of a vehicle.

18. The telescopic structure of claim 17, wherein the damper comprises a hydraulic damper, the hydraulic damper comprises a cylinder and a telescopic bar, the cylinder is connected to one of the first part and the second part, and the telescopic bar is connected to other one of the first part and the second part.

19. The telescopic structure of claim 17, wherein one of the first part and the second part is formed with an accommodating recess part, and other one of the first part and the second part is formed with a slider part slidably cooperated with the accommodating recess part, and wherein the slider part is provided with an extension positioning member supported elastically; when the extension positioning member is located outside the accommodating recess part, the extension positioning member is configured to restrict the retraction of the second part relative to the first part; and when the extension positioning member is located inside the accommodating recess part, the extension positioning member has a surface contacting a wall body of the accommodating recess part, and the surface is provided with a structure for increasing friction force.

20. A child safety seat, comprising:
a telescopic structure of claim 1.

* * * * *